(12) United States Patent
Pasquier et al.

(10) Patent No.: US 11,698,629 B2
(45) Date of Patent: Jul. 11, 2023

(54) METHOD FOR PRODUCING CONTAINERS ON A PRODUCTION LINE, WITH ADAPTATION OF THE PRODUCTION RATE IN THE EVENT OF AN INCIDENT ON THE LINE

(71) Applicant: SIDEL PARTICIPATIONS, Octeville-sur-Mer (FR)

(72) Inventors: Hervé Pasquier, Octeville-sur-Mer (FR); Arnaud Delaunay, Octeville-sur-Mer (FR)

( * ) Notice: Subject to any disclaimer, the term of this patent is extended or adjusted under 35 U.S.C. 154(b) by 593 days.

(21) Appl. No.: 16/645,367

(22) PCT Filed: Aug. 10, 2018

(86) PCT No.: PCT/EP2018/071755
§ 371 (c)(1),
(2) Date: Mar. 6, 2020

(87) PCT Pub. No.: WO2019/048181
PCT Pub. Date: Mar. 14, 2019

(65) Prior Publication Data
US 2020/0285223 A1    Sep. 10, 2020

(30) Foreign Application Priority Data

Sep. 6, 2017 (FR) ...................... 1758218

(51) Int. Cl.
*G05B 19/418* (2006.01)
*B29C 65/00* (2006.01)
*B29L 31/00* (2006.01)

(52) U.S. Cl.
CPC ...... *G05B 19/4189* (2013.01); *B29C 66/0242* (2013.01); *B29L 2031/7162* (2013.01); *G05B 2219/32219* (2013.01)

(58) Field of Classification Search
None
See application file for complete search history.

(56) References Cited

U.S. PATENT DOCUMENTS

| 2009/0099679 A1 | 4/2009 | Sandoval et al. |
| 2014/0200696 A1 | 7/2014 | Batrin et al. |
| 2014/0224617 A1 | 8/2014 | Kalkhoff |

OTHER PUBLICATIONS

International Search Report dated Oct. 16, 2018.
EP Office Action, Application No. 18749823.3, dated Nov. 29, 2021.

*Primary Examiner* — Sean Shechtman

(57) ABSTRACT

The invention relates to a method for operating a facility for producing containers from blanks made of a plastic material, the facility having one or more units for thermally conditioning blanks; one or more units for forming containers from the thermally conditioned blanks; one or more units for transferring containers to a labelling or filling unit; and a control unit that controls at least the thermal conditioning unit(s), the forming unit(s), and the transfer unit(s) by imposing a set speed on each unit, proportionate to a production rate for the containers. The method includes detecting an incident, determining a reduction of the production rate generated by the incident, and applying the reduction to the set speed.

4 Claims, 3 Drawing Sheets

METHOD FOR PRODUCING CONTAINERS ON A PRODUCTION LINE, WITH ADAPTATION OF THE PRODUCTION RATE IN THE EVENT OF AN INCIDENT ON THE LINE

The invention deals with the handling of articles; it relates, more specifically, to a method for operating a facility for handling articles.

Such a facility is conventionally equipped, on the one hand, with at least one system for transporting the articles, which comprises at least a mobile support for the articles and a motorization coupled to this support to displace it along a transport path, and, on the other hand, an electronic or computerized control unit linked to the motorization and programmed to drive the latter according to a predetermined speed setpoint, proportional to a rate of transport of the articles obtained by the facility.

When an incident occurs, which affects the operation of the facility, it is routine practice to immediately stop the latter to allow the intervention of an operator responsible for maintenance of the facility.

During the intervention of the maintenance operator, the facility is stopped; production is interrupted. Significant productivity losses result therefrom.

One exemplary application is the manufacturing of containers from blanks made of plastic material.

This manufacturing is ordinarily performed in a production lire comprising at least:
  a unit for thermally conditioning the blanks,
  a unit for forming the containers from the thermally conditioned blanks;
  a unit for transferring the formed containers to a labeling or filling unit;
  and a control unit which controls, the thermal conditioning unit, the forming unit and the transfer unit, the transfer unit and the labeling or filling unit by imposing on each of them a speed setpoint that is proportional to a rate of production of the containers.

When an incident affects such a production line (for example, fault in closure of a mold with which the forming unit is equipped; untimely limiting of the injection flow rate in this same forming unit; depletion of the stock of labels in the labeling unit), it is known practice to stop the production line to allow maintenance operator to conduct an intervention after which the production line can restart.

During the intervention however, the line is stopped; that being the case, the containers are not manufactured and the production, which, on an ordinary line in which the forming unit is equipped, with twenty or so molds ordinarily reaches several tens of thousands of containers per hour, is interrupted.

One objective is to make it possible, insofar as is possible, to maintenance production even when the facility is affected by an incident.

To this end, there is proposed, firstly, a method for operating a facility for handling articles, this facility comprising at least:
  one system for transporting the articles, which comprises at least a mobile support and a motorization, coupled to the mobile support to displace the latter along a transport path;
  a control unit linked to the motorization and programmed to drive the latter according to a predetermined speed setpoint that is proportional to a rate of transport of the articles obtained by the facility;
  this method comprising the operations of:
    detecting an incident likely to affect the operation of the facility;
    calculating, by the control unit, a reduction of the rate of production, induced by the incident;
    applying this reduction to the speed setpoint.

According to a particular embodiment, in which the articles are containers and in which the system for transporting the containers is a labeling unit comprising a carousel provided with a plurality of processing stations, and several peripheral labeling devices, operations are provided for:
  detecting an unavailability of at least one labeling device;
  reducing the speed setpoint applied to the labeling unit by a rate equal to the rate of unavailability of the labeling devices;
  shunting the unavailable labeling device or devices;
  controlling the labeling all of the containers by means of the operational labeling devices.

According to another embodiment, in which the transport system is a transfer unit equipped with a linear conveyor which extends from an entry point to an exit point, and sensors each capable of detecting a build-up of the articles on the conveyor, there are provided operations of:
  detecting a build-up of articles on the conveyor;
  determining a reduction of the speed to be applied to the motorization by a rate proportional to the detected level of build-up;
  applying the reduction of the speed to the motorization.

There is proposed, secondly, a method for operating a facility for producing containers from blanks made of plastic material, this facility comprising:
  several processing units, namely at least one unit for thermally conditioning the blanks and at least one unit for forming the containers from the thermally conditioned blanks;
  at least one unit for transferring the formed containers a filling unit or a labeling unit;
  a control unit which controls at least the thermal conditioning unit, the forming unit and the transfer unit by imposing on each of them a speed setpoint that is proportional to a rate of production of the containers;
  this method comprising the operations of:
    detecting an incident likely to affect the operation of the facility;
    determining a reduction of the rate of production induced by the incident;
    applying this reduction to the speed setpoint of each processing or transfer unit.

According to one embodiment, operations are provided for:
  detecting the end of the incident;
  it creasing the rate of production to a nominal value;
  increasing the speed setpoint of each processing or transfer unit to a nominal value.

The increasing of the speed setpoints can be performed by an acceleration whose force is inversely proportional to the deceleration induced by the reduction of the speed setpoint following the reduction of the rate.

By virtue of such a method, the production is maintained, even at a reduced rate, for long enough for it not to be essential to interrupt production.

The result thereof is a minimization of the total production interruptions, and consequently increased overall productivity.

Other objects and advantages of the invention will become apparent in light of the description of an embodiment, given hereinbelow with reference to the attached drawings in which.

Figure 1:
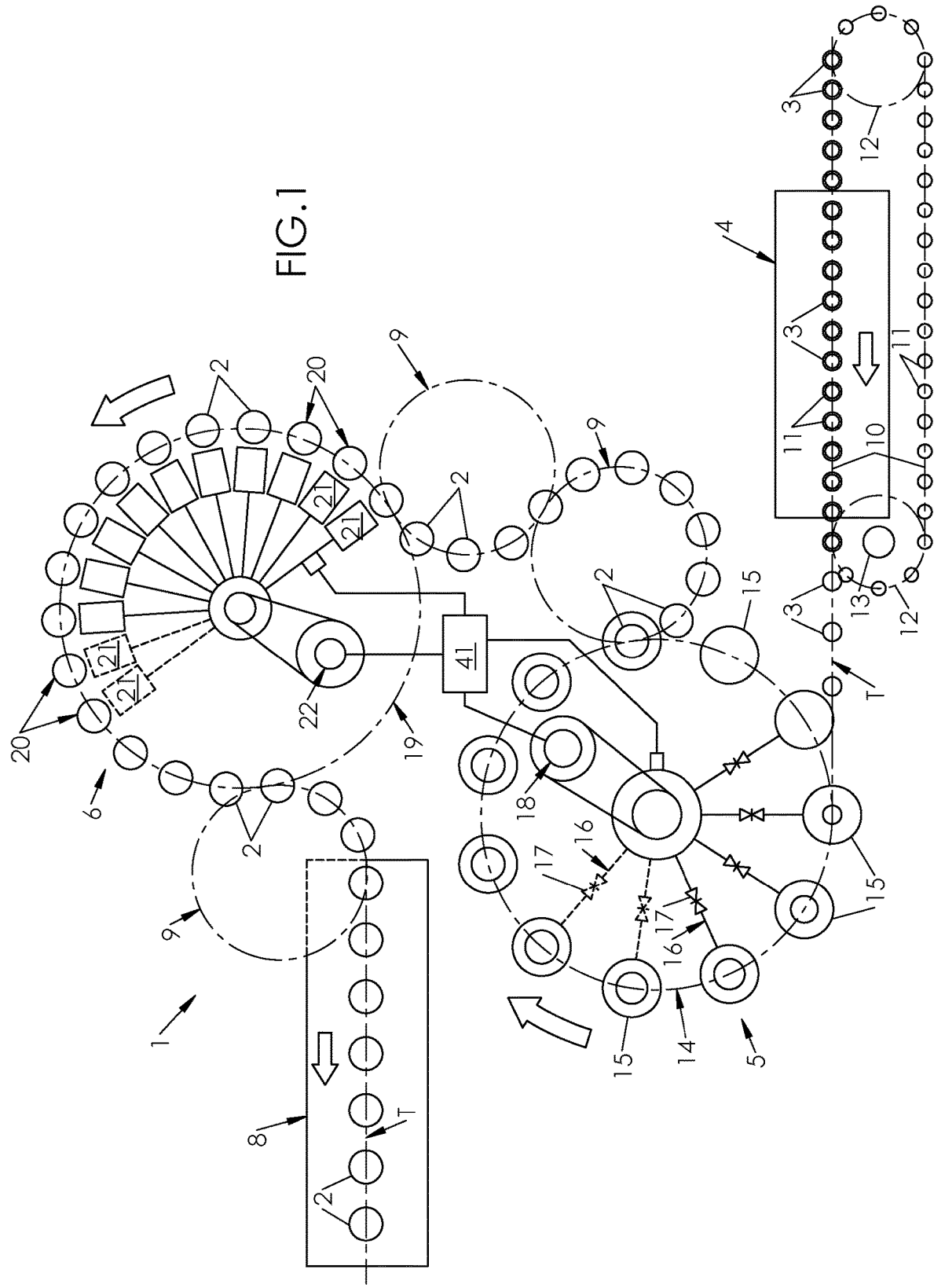
FIG. 1 is a schematic view showing a part of a line for producing containers from blanks made of plastic material.

The drawings partially show a facility 1 for handling articles 2, 3, which comprises at least:
- one system for transporting the articles, which comprises at least a mobile support and a motorization coupled to the mobile support to displace the latter along a transport path;
- a control unit linked to the motorization and programmed to drive the latter according to a predetermined speed setpoint that is proportional to a rate of transport of the articles obtained by the facility.

The articles are for example hollow bodies; they can notably be containers 2 or blanks 3 (for example preforms of containers). Thus, the example illustrated, the facility 1 is a facility for producing containers 2 from blanks 3 made of plastic material (such as PET).

This facility 1 comprises several processing units, namely at least:
- a unit 4 for thermally conditioning the blanks 3,
- a unit 5 for forming the containers 2 from the thermally conditioned blanks 3;
- if appropriate, a filling unit 6;
- possibly a labeling unit 7.

The facility 1 also comprises at least one unit 8, 9 for transferring the formed containers 2 to the filling unit 6 or the labeling unit 7.

The thermal conditioning unit 4, the forming unit 5, the filling unit 6, the labeling unit 7 and each transfer unit 8, 9 can each be considered as a transport system, with which there can possibly be associated a function applied to the blanks 3 (for example the thermal conditioning) or to the containers 2 (for example the forming, the filling or the labeling).

In this respect, the thermal conditioning unit 4, the forming unit 6, the filling unit 6, the labeling unit 7 and each transfer unit 8, 9 each comprise at least a mobile support and a motorization coupled to the mobile support to displace the latter along a transport path T.

Thus, the thermal conditioning unit 4 is equipped with a chain 10 provided with links each bearing a support 11 (called spinner) from which is suspended a blank 3. This chain 10 circulates on wheels 12 of which at least one is driven by a motorization 13.

The forming unit 5 is equipped with a carousel 14 on which are mounted molds 15 with the imprint of a container model, in each of which a blank 3 having undergone a prior thermal conditioning is introduced to be formed therein with that imprint by injection of a gas (ordinarily air) under pressure. To this end, the forming unit 5 is equipped, for each mold 15, with an injection device 16 comprising at least one solenoid valve 17.

The carousel 14 is driven in cyclical rotation by a motorization 18.

The filling unit 6 is also equipped with a carousel 19 on which are mounted filling stations 20 each provided with a filling valve 21 by which a content (liquid, paste or even powder) is introduced into a container 2.

This carousel 19 is also driven in cyclical rotation by a motorization 22.

The labeling unit 7 is, also, equipped with a carousel 23 provided with a plurality of processing stations 24 each capable of accommodating a container 2, and several peripheral labeling devices 25.

Each processing station 24 is configured to hold a recipient 2 and to drive it in rotation about its own axis, while making it circulate in line with a peripheral labeling device 26.

This carousel 23 is also driven in cyclical rotation by a motorization 26.

Each labeling device 26 ensures the labeling of some of the containers 2. Thus, in the example illustrated in FIG. 3, the labeling unit 7 is equipped with three labeling devices 25 which each ensure the labeling of a third of the containers 2.

According to a particular embodiment, each labeling device 26 comprises an unwinder 27 on which is mounted a reel 28 including a film 29 bearing labels wound on itself, an applicator cylinder 30 tangential to the carousel 23 and on which circulates the film 29 to allow a label to be wound onto a container 2, and, if appropriate, one or more intermediate rollers 31 for tensioning and/or guiding the film 29, inserted between the unwinder 27 and the applicator cylinder 30.

Figure 3:
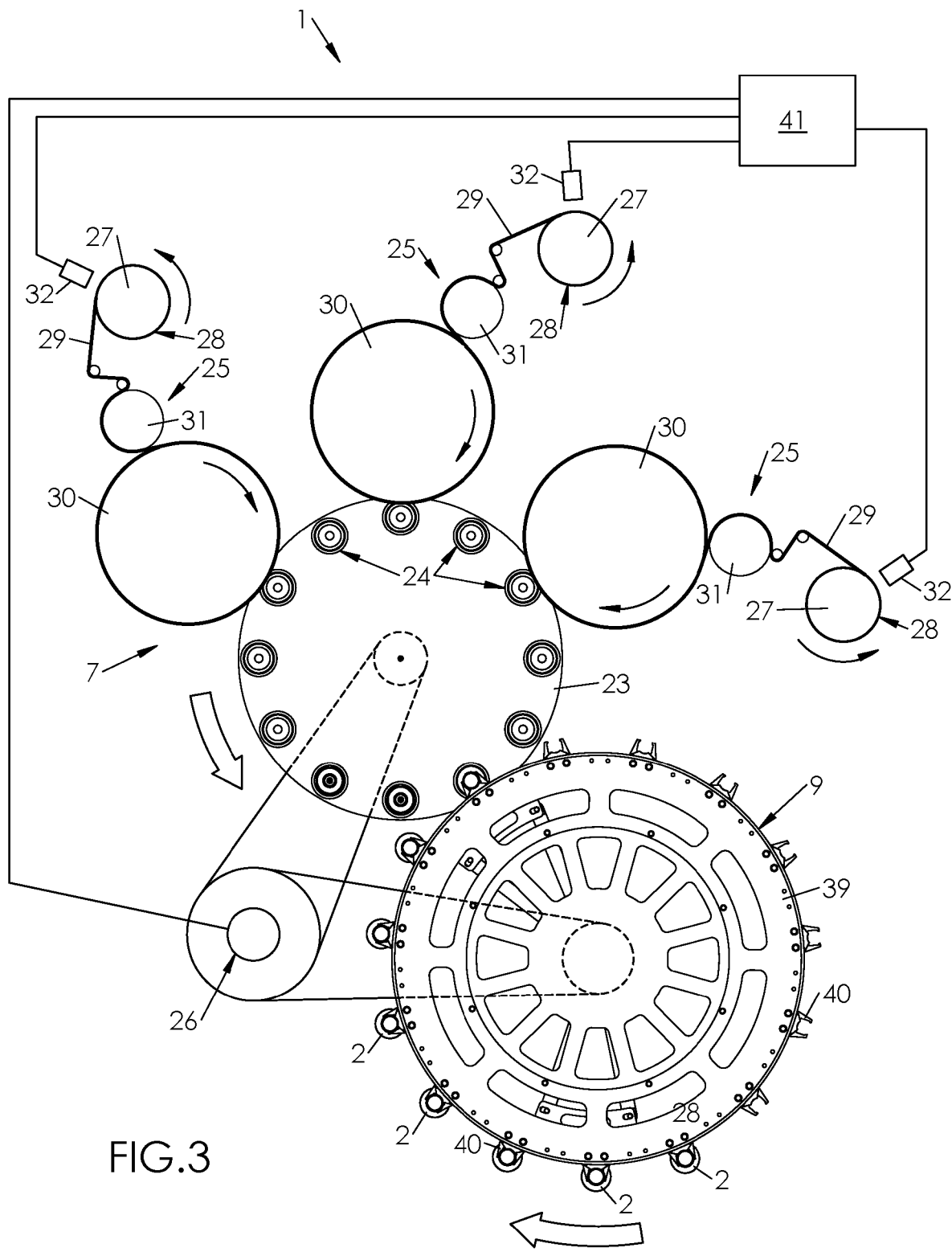
FIG. 3 is a schematic view showing yet another part of the contain production line.

As illustrated in FIG. 3, the labeling unit 7 is advantageously equipped, for each labeling device 26, with a sensor 32 (for example optical) designed to detect an unavailability (and therefore a failure) of the labeling device 26, most commonly the depletion of the film 29 (for example by depletion of the reel).

Figure 2:
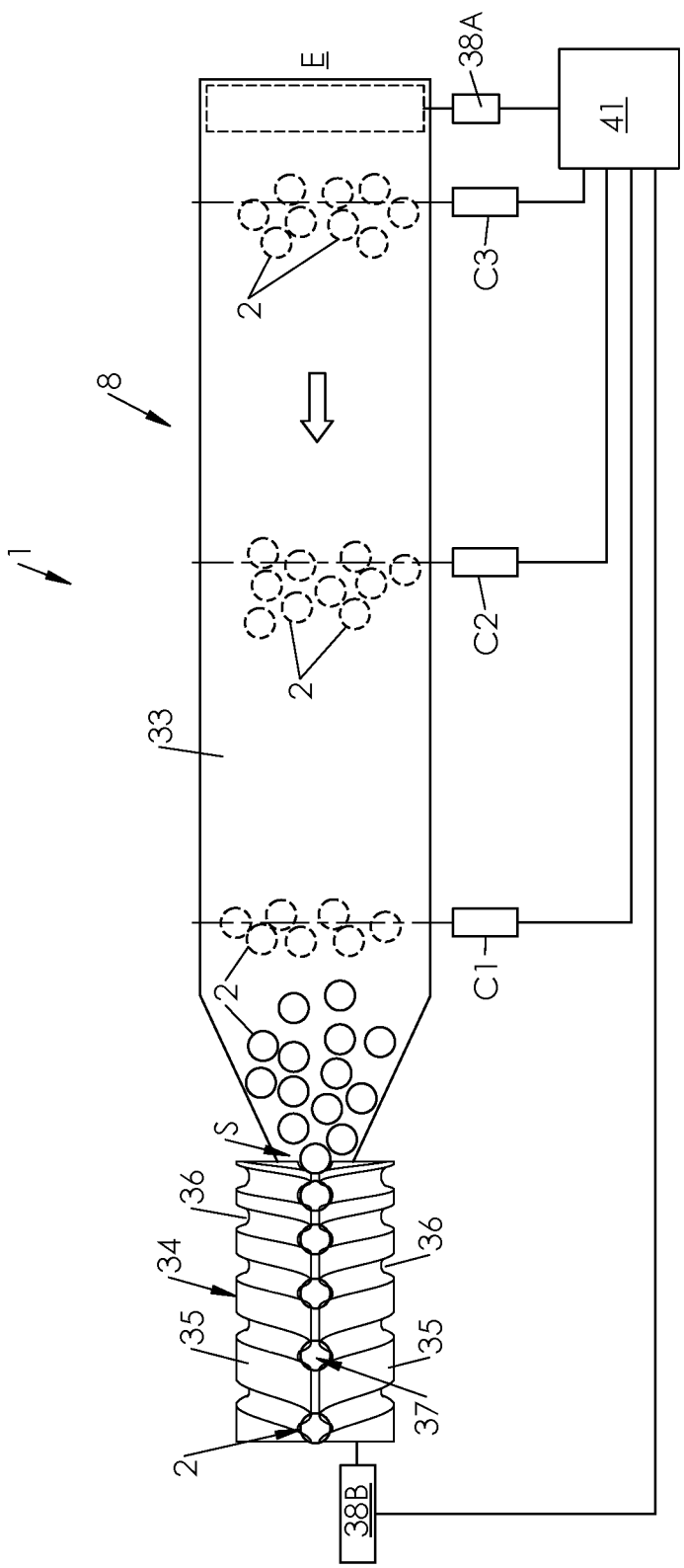
FIG. 2 is a schematic view showing another part of the container production line.

A transfer unit 8 of linear type is represented in FIG. 2. This transfer unit 8 comprises a linear conveyor 33. The conveyor 33 is for example a band, belt or even roller conveyor. The conveyor 33 extends from an entry point E to an exit point S.

At the entry point E, the containers 2 are taken over on exiting a processing unit situated upstream (for example the forming unit 5). At the exit point S, the containers 2 can be taken over directly by a processing unit (for example the filling unit 6 or the labeling unit 7), or by a pacing device 34 which progressively spaces the containers 2 apart by a predetermined distance corresponding to the separation between two successive processing stations on the processing unit placed downstream of the transfer unit 8.

In the example illustrated in FIG. 2, the pacing device 34 is of worm screw type. To this end, it comprises two adjacent rollers 35 provided with symmetrical helical grooves 36 which, together, form a series of cells 37 each gripping a container 2 to accelerate it in line with the rotation of the rollers 35.

The linear transfer unit 8 is provided with a motorization 38A driving the conveyor 33. In the example illustrated, the transfer unit 8 is also provided with a motorization 38B driving the pacing device 34.

This transfer unit 8 of linear type can fulfil a function of temporary build-up of the articles (here of the containers 2) to constitute a buffer stock intended to make up for any speed differentials between machines situated upstream (for example the forming unit 5) and machines situated downstream (for example the labeling unit 7).

A transfer unit 9 of rotary type is represented in FIG. 3. This transfer unit 9 comprises a wheel 39 and a plurality of gripping members 40 (here clamps) mounted on the wheel 39 on a periphery thereof.

The wheel 39 is secured to a shaft driven in cyclical rotation by a motorization 26. In the example illustrated, the transfer unit 9 is coupled to the labeling unit 7. In this case, the carousel 23 of the labeling unit 7 and the wheel 39 of the transfer unit can be driven by a common motorization 26, for example via pulleys and belts.

Other transfer units 9 of rotary type are illustrated schematically by chain dotted lines in FIG. 1. These transfer units 9 are inserted, in this example, on the one hand between the forming unit 5 and the filling unit 6, on the other hand between the filling unit 6 and a transfer unit 8 of linear type, downstream of which the labeling unit 7 can be situated.

In this case, a transfer unit 9 is preferably inserted between the linear transfer unit 8 and the labeling unit 7. Thus, the containers 2 placed at the exit S of the linear transfer unit 8 are taken at constant intervals by the rotary transfer unit 9 and delivered to the carousel 23 of the labeling unit 7.

As illustrated schematically in the drawings, the facility 1 further comprises a control unit 41 which ensures the operating of the facility 1.

To this end, the control unit 41 controls at least the thermal conditioning unit 4, the forming unit 5 and the transfer unit 8, 9 (or each transfer unit 8, 9) by imposing upon each of them a speed setpoint that is proportional to a rate of production of the containers 2.

In the example illustrated, the control unit 41 also controls the filling unit 6 and the labeling unit 7, on each of which it also imposes a speed setpoint that is proportional to the rate of production of the containers 2.

More specifically, the control unit 41 is linked to the motorizations which drive the processing (or transfer) units, for which it controls the speed (linear or rotational).

The rate of production is the number of containers 2 produced (or of articles handled) per unit of time (for example per hour). It consequently concerns a throughput.

In theory, the rate of production is identical for each processing unit, that is to say that the throughputs of the containers 2 leaving the different processing units are identical. There can however be a few variations, which, as has been mentioned, can be made up for in time by build-up of the containers 2 in buffer storage zones (in this case, in the linear transfer unit 8 represented in FIG. 2).

On the other hand, the speed (linear or rotational) is specific to each processing unit and to each transfer unit, in other words, with each processing or transfer unit there is associated, in a memory of the control unit 41, a speed setpoint to be applied to the motorization driving this processing or transfer unit to allow it to observe a predetermined rate of production.

The control unit 41 is programmed to carry out actions that make it possible to maintain the production, even at reduced rate, including in the case of an incident affecting the (normal) operation of the facility 1.

More specifically, the control unit 41 is programmed to:
detect an incident affecting the operation of the facility 1;
determine a reduction of the rate of production induced by the incident;
apply this reduction to the speed setpoint of each processing unit.

Among the incidents likely to affect the operation of the facility, examples that can be cited include:
a) a fault affecting one or more injection devices 16 associated with one or more of the molds 15 of the forming unit 5, being reflected notably in a lowering of the gas flow rate in the blanks 3;
b) a fault affecting one or more solenoid valves 17 of the filling unit 6, being reflected notably in a lowering of the rate of filling of the containers 2;
c) the depletion of a reel 28 on the labeling unit, being reflected in the corresponding labeling device 25 being taken out of service.

These three cases can be detected directly by the control unit 41, by means of sensors.

In the case a), the forming unit 5 is for example equipped with pressure (or flow rate) sensors on each injection device 16. These sensors are linked to the control unit 41 with which they communicate the instantaneous value of the pressure (or of the flow rate) of fluid circulating in the corresponding device 18.

In the case b), the filling unit 6 is for example equipped with flow rate sensors for each filling station 20. These sensors are linked to the control unit 41 with which they communicate the instantaneous value of the flow rate of fluid circulating in the corresponding filling valve 21.

In the case c), the sensors 32 already mentioned are linked to the control unit 41 with which they communicate, at each instant, an item of information relating to the weight or to the volume of the reel 28 present on each unwinder 27.

It may be that an incident occurring on a processing unit and likely to affect the facility 1 is not directly detectable, but that it is indirectly detectable by the effects induced on the facility 1 upstream or downstream of the processing unit concerned.

Thus, a processing unit operating in degraded mode situated downstream of the linear transfer unit 8 can provoke a build-up of containers 2 on the conveyor 33. In this case, illustrated by dotted lines in FIG. 2, several levels of build-up can be reached in the linear transfer unit 8, corresponding to different respective reductions of the rate of production.

In the example illustrated in FIG. 2, three distinct levels of build-up are defined. To detect each level of build-up, the linear transfer unit 8 is equipped with sensors C1, C2, C3 (for example optical), linked to the control unit 41 to which each addresses an item of information relating to the presence (or absence) of articles (here of containers 2).

The control unit 41 is then programmed to determine a reduction of the rate of production that is proportional to the level of build-up reached. The control unit 41 is programmed, primarily, to determine a reduction of the speed applied to the motorization 38A (and, if appropriate, to the motorization 38B) by a rate proportional to the level of build-up reached (that is to say detected by at least one sensor C1, C2, C3).

Thus, the control unit 41 can be programmed to determine a reduction of the rate of production (and above all of the speed of the motorization 38A):
by a low rate (typically 20%) when the build-up reaches a low first level (detected by the sensor C1 represented on the left in FIG. 2);
by a median rate (typically 40%) when the build-up reaches a median second level (detected by the sensor C2 represented at the center in FIG. 2);
by a high rate (typically 80%) when the build-up reaches a high third level (detected by the sensor C3 represented on the right in FIG. 2).

The control unit 41 programmed to, once the rate reduction induced by the incident detected (directly or indirectly) has been calculated, apply this reduction to the speed setpoint of each processing (or transfer) unit.

In that way, the real rate of production is realigned on the rate calculated by the control unit 41 taking into account the reduction induced by the incident.

This reduction adapted to the real rate of production makes it possible to slow down the facility 1 without however stopping it, so as to allow a possible prior intervention which does not require a complete stoppage of the facility 1.

Thus, in the case c) mentioned above, the reduction of the rate of production consists, for the labeling unit 7, in performing the following operations:

reducing the speed setpoint applied to the labeling unit 7 (that is to say, in the example illustrated, the speed setpoint applied to the motorization 26) by a rate equal to the rate of unavailability of the labeling devices 25;

shunting (in other words, bypassing) the labeling devices 25 that are unavailable—for example, in the above-mentioned example, that or those for which the reel 28 is empty;

controlling the labeling of all of the containers 2 by means of the operational labeling devices 26.

The shunting of each unavailable labeling device 25 consists for example in separating the roller 30 from the path of the containers 2 (that is to say from the carousel 23). To this end, the roller 30 is advantageously mounted on a mobile support (mobile translationally or rotationally), the displacement of which is controlled by the control unit 41.

The result of the above is reduction of the rate by a rate equal to the rate of unavailability of the labeling devices (33% in the above-mentioned example, in which one labeling device 26 in three is unavailable).

The control unit 41 passes on this rate reduction to the other processing (and transfer) units by reducing their respective speeds by the same rate.

When the incident is ended, the control unit 41 is informed thereof.

Thus, in the case c) mentioned above, once the labeling device or devices 25 are once again operational (that is to say, in the example illustrated, once a new reel 28 is installed on the or each depleted labeling device 25), the control unit 41 receives from the corresponding sensor C1, C2 or C3 a signal characteristic of the availability of the labeling device or devices 26 (and characteristic, here, of the presence of a full reel 28), such that the labeling unit 7 can once again (with the rest of the facility 1) run at full speed.

The control unit 41 consequently increases the speed setpoints of the processing (or transfer) units to their respective nominal values (corresponding to normal production), so as to increase the rate of production to its nominal value (corresponding to normal production).

It may be that raising the rate requires a stepwise progression, to avoid having both the processing (or transfer) units and the articles 2, 3 undergo excessively abrupt accelerations likely to damage them.

To this end, the force of the acceleration ordered on each processing (or transfer) unit by the control unit 41 can be inversely proportional to the deceleration force ordered on each processing unit at the time of the rate reduction imposed by the incident. Thus this acceleration can be:

high if the rate reduction was initially low;
average if the rate reduction was initially median;
low if the rate reduction was initially high.

Tests conducted on a facility 1 for producing containers 2 have shown the effectiveness of the operating method described above, which makes it possible not only to maintain the production (even at reduced rate), but also to maintain a good quality of the containers 2 produced.

It will be noted that the present description should not be considered to be limited to the embodiments described above by way of example, and that certain variants or alternatives accessible to a person skilled in the art could be considered without departing from the scope of the invention.

The invention claimed is:

1. A method for operating a facility (1) for handling articles (2), the method comprising:

detecting, via control unit (41), an incident slowing a normal production rate of the facility (1), wherein the control unit (41) is programmed to control a plurality of processing units (5, 6, 7, 8, 9), wherein each processing unit is equipped with one or more sensors, wherein the detecting comprises one or more of the sensors communicating to the control unit (41) a fault in a component (16, 18, 20, 21, 25, 28, 27) of a processing unit of the plurality of processing units, wherein the processing unit is selected from a thermal conditioning unit (4), a forming unit (5), a filling unit (6), and a labeling unit (7), and wherein each processing unit is linked to a downstream processing unit by one or more transfer units (8,9), wherein each processing unit and each transfer unit has a first speed setpoint during normal facility operations, and wherein the first speed set point can be the same or different for each processing unit and transfer unit such that the control unit (41) can control the first speed setpoint independently of any other processing unit or transfer unit;

calculating, by the control unit (41), a reduction of the rate of production of the processing unit induced by the fault;

reducing, by the control unit (41), a speed of one or more of the processing units or transfer units to a second speed set point such that the reduction of speed is proportional to the slowed production rate, wherein each processing unit and each transfer unit comprises a respective motorization (13,18, 22, 26, 38A, 38b) coupled to a respective mobile support (11, 12, 14, 19, 23, 33), wherein the control unit (41) controls the second speed setpoint by reducing a motorization speed; and accelerating the second setpoint speed at an inverse rate to the reduction when the incident is corrected, such that the production rate returns to normal.

2. The method according to claim 1, wherein the mobile support for each processing unit is a carousel, and wherein the mobile support for each transfer unit is a linear conveyor or a carousel, and wherein the facility can comprise a plurality of transfer units having linear conveyors, carousels, or combinations thereof.

3. The method according to claim 1, wherein the detected incident occurs in a labeling unit (7), the labeling unit comprising a plurality of processing stations (24) feeding a plurality of peripheral labeling devices (25);

detecting, via a sensor, an unavailability of at least one of the peripheral labeling devices (25);

reducing the first speed setpoint of the labeling unit (7) by a rate equal to the rate of unavailability of the labeling devices (25);

shunting the unavailable labeling device or devices (25); and controlling the labeling of all of the containers (2) by means of the operational labeling devices (25).

4. The method according to claim 1, wherein the detected incident occurs on a transfer unit (8) comprising a linear conveyor, wherein the linear conveyor extends from which extends from an entry point (E) to an exit point (S), wherein:
- the detecting, via sensors (C1, C2, C3), detects a build-up of articles (2) on the linear conveyor (33);
- the speed of the transfer unit (8) is reduced to the second speed setpoint at a rate proportional to the detected build-up level;
- the reduction of the speed setpoint is applied to the motorization (38A).

* * * * *